No. 775,150. PATENTED NOV. 15, 1904.
S. C. ROCKMAN.
AUTOMOBILE.
APPLICATION FILED JAN. 21, 1904.
NO MODEL.
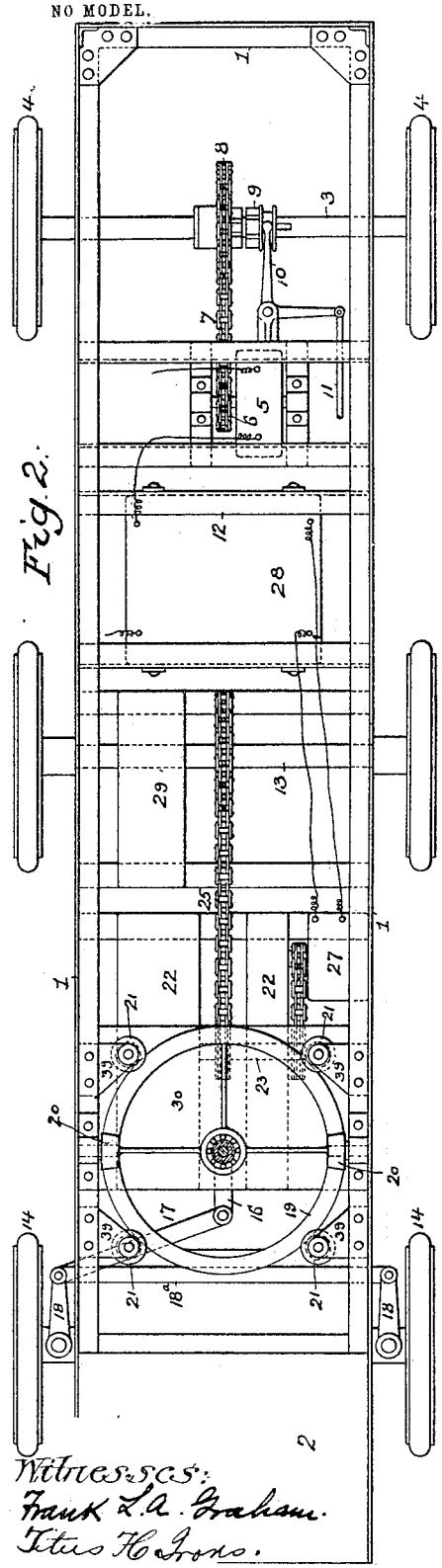

No. 775,150. Patented November 15, 1904.

UNITED STATES PATENT OFFICE.

SOREN C. ROCKMAN, OF PHILADELPHIA, PENNSYLVANIA.

AUTOMOBILE.

SPECIFICATION forming part of Letters Patent No. 775,150, dated November 15, 1904.

Application filed January 21, 1904. Serial No. 190,065. (No model.)

*To all whom it may concern:*

Be it known that I, SOREN C. ROCKMAN, a citizen of the United States, residing in Philadelphia, Pennsylvania, have invented certain Improvements in Automobiles, of which the following is a specification.

The object of my invention is to construct an automobile of large capacity, and therefore capable of extended use, such as for public passenger service, for delivery-wagons, for military transport, for exploration or surveying parties, or as a private or family parlor touring-car provided with means for habitation while sojourning on the road, the car being supplied with self-contained power and propelling means, so that by convenient storage of a proper supply of liquid fuel it may remain in active service away from a supply-station for a considerable length of time. The car is so constructed as to bring an equal load upon each of the wheels by equalizing the total weight of machinery and burden to be carried by each wheel, thus prolonging the life of the car, and the tractive power of the car is increased by increasing the number of wheels available as drivers, thereby correspondingly adding to its efficiency and enabling it in emergency to pull another car or cars.

In the accompanying drawings, Figure 1 is a side view of the framework and driving devices of an automobile constructed in accordance with my invention. Fig. 2 is a plan view of the same. Fig. 3 is an enlarged vertical sectional view of part of the device. Fig. 4 is a side elevation of a special form of hanger for one of the supporting-wheels of the main frame, and Fig. 5 is a vertical sectional view illustrating a modification of one of the features of my invention.

Referring first to Figs. 1 and 2 of the drawings, 1 represents the main frame of the vehicle extending beyond the front and rear trucks and carring the body of the vehicle, which may be suitably designed for accommodating passengers or freight, or both, depending upon the service for which the vehicle is intended. This main frame is also by preference provided with a structure 2 for containing a water-tank $v$, boilers $w$, burners $x$, and condenser $y$ in case steam is used as a motive power for the vehicle, or containing a cooler or condenser or other appurtenances in the event of the power employed being gas or gasolene, or serving as a carrier for all or part of the cells of the storage battery if the motive power employed is electricity.

The main frame 1 has bearings for a rear axle 3, which is provided with driving-wheels 4, said rear axle being driven by any desired motive-power device, that shown in the drawings being an electric motor 5, whose armature-shaft has a sprocket-wheel 6, which by means of a chain 7 drives a sprocket-wheel 8, the latter being clutched to or released from the axle 3 by means of a sliding clutch-collar 9, operated by a bell-crank lever 10, which can be connected, by means of a rod 11, to a suitable operating-lever in the cab of the vehicle.

Pivotally mounted beneath the front portion of the main frame 1 of the vehicle is a shorter underframe 12, having a driving-axle 13 and a pair of steering-wheels 14, the latter being hung to the frame 12 in the usual manner and being capable of swinging simultaneously in one direction or the other, such movement being effected by means of a steering-post 15, which has an arm 16, connected by a link 17 to an arm 18 on one of the steering-wheel hangers, said arm being connected by a transverse rod or bar $18^a$ to a corresponding arm on the other steering-wheel hanger.

The frame 12 has mounted upon it at a point between its two pairs of wheels a turn-table 19, flanged at its upper edge and preferably composed of a channel-bar, so as to provide a lower flange, whereby it may be secured to the frame 12, the upper flange of this turn-table providing a track for a pair of rollers 20, which are mounted upon the frame 1, and thus serve as a means for vertically supporting said frame upon the frame 12.

Preferably some elastic means should be inserted between the axles of the rollers 20 and the fixed portion of the frame 1, so as to provide a yielding or elastic support for the front portion of the frame, and thereby prevent transmission to the body of the vehicle of the shocks or jars to which the truck-frame 12 is subjected because of rough road.

A simple form of elastic support for the rollers 20 is shown in Fig. 4 and consists of a yoke 35, bearing upon a pneumatic cushion 36 or other suitable spring structure interposed between said yoke and a seat 37, secured to the frame 1, the yoke being vertically guided at its opposite ends by means of studs or pins 38, depending from the frame 1, these studs also receiving the nuts, whereby the spring-seat 37 is secured to said frame.

The frame 1 is laterally and longitudinally confined to the frame 12 by means of flanged rollers 21, mounted upon vertical spindles carried by brackets 39 or other suitable supports on the main frame 1, these flanged rollers engaging the upper flange of the turn-table 19, so that the latter can have neither forward nor side movement independently of the frame 1, although the vertical movement of the two frames independently of each other is permitted either by providing the necessary amount of space between the upper and lower flanges of the rollers 21 or by permitting said rollers to move vertically upon their spindles to the desired extent.

The underframe 12 is by reason of the connection described at perfect liberty to turn around the axis of the turn-table 19 for steering purposes, and a certain amount of fore and aft tipping or tilting movement of said turn-table is permitted by reason of the fact that the contact-points of the rollers 20 and the upper flange of the turn-table 19 constitute, in effect, a horizontal pivoting device disposed on opposite sides of the axis of the turn-table. Hence the slight tipping or tilting of the truck-frame 12, caused by the passage of its wheels over slight inequalities in the road, will not be transmitted to the frame 1 or to the main body of the vehicle.

The frame 12 is provided with suitable spring-hangers for the bearings of the axle 13 and for the steering-wheel hangers, and like spring-mounts are provided for the rear axle-bearings. Hence a properly-cushioned support of the frame 1 is insured and shocks upon any of the three pairs of wheels are not transmitted to the body structure of the vehicle. The underframe 12 carries engines 22 and 22ª of any desired character, whereby power is transmitted to the shaft 23, no attempt being made on the drawings to show the construction of these engines, since that forms no essential part of my invention.

The engines may be similar to each other and may be driven by like power, or the power for driving one may be different from that for driving the other, and one engine may be light and the other heavy, so as to permit the use of either or both, and thus closely adapt the power of the vehicle to the conditions of the traffic or the work which it has to perform, suitable clutching devices being of course provided, so that the engines can be used either individually or collectively.

Power may be transmitted from the shaft 23 to the driving-axle 13 in any suitable manner, the means employed in the present case consisting of a sprocket-wheel 24 on the shaft 23, which by means of a chain 25 drives a sprocket-wheel 26 on the axle 13. The shaft 23 is also intended to drive a dynamo 27, whose armature-shaft is connected to the shaft 23 by any suitable system of gearing having as an element a clutch, whereby the operation of the dynamo can be stopped or started at the will of the attendant.

The dynamo serves to charge a storage battery 28, mounted on the frame 12, the current from the battery supplying the motor 5 under control of a suitable switch 40 and this current also being available for lighting the vehicle, if desired. Also mounted upon the frame 12 is a tank for containing gasolene, which may constitute the motive fluid for the motive engine, or in case steam is used as a motive power may constitute the fuel for heating the steam-generators.

While I prefer to use the turn-table 19 and the engaging rollers 21 as a means of connecting the two frames 1 and 12 of the vehicle, it will be evident that the same may be connected by an ordinary king-bolt, such as is employed in connecting swinging trucks of cars, the king-bolt, however, being hollow, so as to permit of the passage of the steering-rod 15 therethrough. In some cases also a fifth-wheel construction may be adapted in place of the turn-table, one such construction being illustrated in Fig. 5, in which 41ª represents the member carried by the frame 12 and 42 the member carried by the frame 1, the connection between said member 42 and the frame 1, however, being by means of laterally-projecting pivot-pins 43, which are adapted to suitable sockets 44, secured to said frame 1, so as to provide for the fore-and-aft tipping or tilting of the frame 12 as well as for the swinging of the same around the vertical axis.

When the turn-table 19 is employed, I prefer to provide the same with a bottom plate 30, having an upwardly-projecting boss or hub 31 for the reception of a projecting boss or hub 32 on the frame 1, said boss 32 being tubular for the passage of the steering-post 15, as shown in Fig. 3, and antifriction-rollers 33 being interposed between the hubs or bosses 31 and 32, said rollers being tapered or barrel-shaped, as shown in Fig. 3, so as to permit of the tipping or tilting of the frame 12 independently of the frame 1. The plate 30 extends forwardly only to the hub 31, so that the forward half of the turn-table 19 is open for the reception of levers, pipes, rods, wires, or other connections between the parts carried by the frame 1 and those carried by the frame 12.

The location of the turn-table 19 or other support for the frame 1 between the front and rear wheels of the truck-frame 12 serves to so distribute the load upon said frame 12 as to equalize the weight upon each of the six wheels of the vehicle, thereby insuring the proper grip of each wheel upon the roadway, preventing slipping of any of the wheels, and lessening the tendency to rapid wear which would arise from overloading.

A steering-post 45, supplementary to the steering-post 15, is located in advance of the same, the two being connected by means of bevel-gears 46, 47, 48, and 49 and a short longitudinal shaft 50, so that the vehicle can be steered either from the platform 30 or a platform 51 above it or from a platform 52 in advance of the same. In this case a segmental or other opening in the frame 1 is provided to permit of the lateral movement of the steering-post 45 as it swings with the truck 12.

My idea of distributing the weight evenly upon the six wheels of the vehicle may also be embodied in a structure in which the steering-wheels are mounted upon the frame 1, the truck-frame 12 only carrying the forward driving-wheels, and in this case the turn-table may be carried by the frame 1 and the members engaging the same may be carried by the frame 12, the latter acting with a pushing effect instead of with a pulling effect upon said frame 1.

Instead of driving the rear axle 3 by means of a separate motor, moreover, power may be transmitted thereto from one or both of the engines 22 through suitable connections provided with clutches, whereby connection may be readily established or discontinued.

It will be evident that an automobile of the character described provides a high degree of tractive effect, power being directly applied both to the rear wheels of the frame 1 and to the driving-wheels of the truck-frame 12 or to either of these pairs of wheels as the demands of the moment may suggest, the machine constructed as shown in Figs. 1 and 2 being also provided with three independent motors, which can be used either collectively or independently to meet emergency or to suit the varying conditions under which the vehicle is running. For instance, the electric motor which drives the rear axle may be used alone in cases where the exhaust from the other motive-power engine or engines would be objectionable, or it may be used to assist the other motive-power engine or engines in driving the vehicle up a grade or a over a difficult piece of road, or it may be used for short hauls or for turning, being out of operation during the running of the vehicle down grade or on an easy road, at which time the running of the dynamo and the charging of the battery 28 may be effected.

Having thus described my invention, I claim and desire to secure by Letters Patent—

1. An automobile having a main frame, a truck-frame pivoted beneath the forward end of the same, a pair of steering-wheels and forward and rear pairs of driving-wheels, the forward pair of driving-wheels and the steering-wheels being carried by the pivoted truck, the main frame extending over all of said wheels and the connection between the main frame and the truck-frame being so disposed as to distribute the weight evenly upon the three pairs of wheels, substantially as specified.

2. An automobile having a main frame with supporting-wheels at the rear end, and a supplementary truck-frame pivoted to the main frame at the forward end, and having driving and steering wheels, and a motive-power engine for said driving-wheels, the main frame extending over all of the wheels and the pivotal connection between the main frame and the truck-frame being at a point between the steering and driving wheels of such truck-frame, so as to distribute the weight upon both sets of wheels, substantially as specified.

3. An automobile having a main frame with supporting and driving wheels at the rear end, a supplementary truck-frame pivotally mounted beneath the forward portion of said main frame, and having both driving and steering wheels, and motive-power devices on said pivoted truck-frame for driving the wheels of both the main and truck frames, substantially as specified.

4. An automobile having a main frame with supporting and driving wheels at the rear end, a supplementary truck-frame pivoted beneath the forward portion of said main frame and having steering and driving wheels and motive-power devices on said pivoted truck-frame for driving the wheels of both the main and truck frames, the pivotal connection between said main and truck frames being between the front and rear wheels of the truck-frame, so that the weight is distributed upon both sets of wheels, substantially as specified.

5. An automobile having a main frame with supporting and driving wheels at the rear end and a supplementary truck-frame pivoted beneath the forward portion of said main frame and having driving-wheels thereon, steering devices, a motive-power engine for the driving-wheels of the truck-frame, an electric motor for the driving-wheels of the main frame, a storage battery for supplying current to said motor, and a dynamo operated by the motive-power device on the truck-frame and serving to charge said battery, substantially as specified.

6. An automobile having a main frame, supporting-wheels therefor, a supplementary truck-frame located beneath the main frame, a turn-table on one of said frames, and wheels carried by the other frame and having vertical faces in engagement with corresponding vertical faces on said turn-table, substantially as specified.

7. An automobile having a main frame, supporting-wheels thereon, a supplementary truck-frame located beneath the main frame and having steering-wheels thereon, a turn-table on said truck-frame, wheels mounted upon the top of said turn-table and carried by the main frame and rollers engaging the edge of the turn-table and also carried by said main frame, substantially as specified.

8. An automobile having a main frame and a supplementary truck-frame beneath the same, a turn-table on said truck-frame and rollers running on said turn-table and having vertically-elastic supports whereby they are connected to the main frame, substantially as specified.

9. An automobile having a main frame and a supplementary truck-frame located beneath the same, a turn-table on said truck-frame, having a flange thereon, supporting-rollers mounted on the main frame and running on said turn-table, and flanged rollers carried by the main frame and engaging said flange of the turn-table, substantially as specified.

10. An automobile having a main frame and a supplementary truck-frame located beneath the same, a turn-table on one of said frames, and hub and ring connections between the other frame and the turn-table, said connections having vertical faces in engagement with each other, substantially as specified.

11. An automobile having a main frame and a supplementary truck-frame located beneath the same, a turn-table on one of said frames, and diametrically opposite rollers bearing on said turn-table and mounted in bearings on the opposite frame, whereby they constitute a horizontal pivotal axis for the truck, substantially as specified.

12. An automobile having a main frame and a supplementary truck-frame located beneath the same, and having steering-wheels thereon, and two connecting steering devices, one in advance of the other, substantially as specified.

13. An automobile having two connected vertical steering-posts located one in advance of the other, substantially as specified.

14. An automobile having a main frame, a truck-frame beneath the same, and a turn-table on said truck-frame having a circular rim and both an axial opening, and a segmental opening therethrough, substantially as specified.

15. An automobile having a truck-frame carrying driving-wheels, steering-wheels and motive-power mechanism for operating said driving-wheels, a main frame extending forwardly over the steering-wheels of the truck-frame, and to which said frame is pivoted, and a steering-post for said pivoted truck-frame located within the limits of the forward portion of the main frame, substantially as specified.

16. An automobile having a truck-frame carrying driving-wheels, steering-wheels and motive-power mechanism for operating said driving-wheels, a main frame having driving-wheels at its rear end and having a forward portion extending forwardly beyond the wheels of the forward truck, and having pivotal connection with said truck, that portion of said forward end of the main frame which is in advance of the pivotal connection, having no connection with the truck-frame, substantially as specified.

17. An automobile having a truck-frame carrying driving-wheels, steering-wheels and motive-power mechanism for operating said driving-wheels, a main frame having driving-wheels at its rear end, and having a forward portion extending forwardly beyond the wheels of the truck-frame and carrying at its front end a cooler or condenser, said forward portion of the main frame also having pivotal connection with the truck-frame, substantially as specified.

In testimony whereof I have signed my name to this specification in the presence of two subscribing witnesses.

SOREN C. ROCKMAN.

Witnesses:
 HENRY NOAR,
 JOS. H. KLEIN.